(12) United States Patent
Ellenberger

(10) Patent No.: US 6,485,233 B1
(45) Date of Patent: Nov. 26, 2002

(54) FOAMING COMPOSITION

(75) Inventor: Peter Ellenberger, Feldmeilen (CH)

(73) Assignee: MBT Holding AG, Zurich (CH)

( * ) Notice: Subject to any disclaimer, the term of this patent is extended or adjusted under 35 U.S.C. 154(b) by 0 days.

(21) Appl. No.: 09/508,829

(22) PCT Filed: Sep. 15, 1998

(86) PCT No.: PCT/EP98/05905

§ 371 (c)(1),
(2), (4) Date: May 19, 2000

(87) PCT Pub. No.: WO99/18330

PCT Pub. Date: Apr. 15, 1999

(30) Foreign Application Priority Data

Oct. 2, 1997 (GB) ............................... 9720846

(51) Int. Cl.⁷ .............................. E21D 9/06; E21D 9/12
(52) U.S. Cl. ....................................... 405/141; 523/131
(58) Field of Search ................................ 524/156, 155; 523/130, 131; 175/72; 405/138, 141, 146, 150.1, 150.2, 263, 264

(56) References Cited

U.S. PATENT DOCUMENTS

| 3,215,200 A | 11/1965 | Kirkpatrick et al. ........ 166/44 |
| 4,247,405 A | 1/1981 | Wier ..................... 252/8.55 D |

FOREIGN PATENT DOCUMENTS

| FR | 2 690 709 | 11/1993 | ............ E21D/9/08 |
| WO | WO90/00187 | 1/1990 | ............ C09K/7/02 |

OTHER PUBLICATIONS

Patent abstracts of Japan, vol. 008, No. 098 (C–221), May 9, 1984 & JP 59 015476 A.

PCT International Search Report for PCT/EP98/05905 dated Feb. 10, 1999.

English language abstract of FR 2 690 709.

Primary Examiner—Frederick L. Lagman
(74) Attorney, Agent, or Firm—Fish & Richardson P.C.

(57) ABSTRACT

A method of boring a tunnel through a stratum utilizing a shield tunneling apparatus, the process comprising the injection into the stratum at the cutting face of an aqueous material comprising (a) from 0.005–0.05% by weight of a polyethylene oxide of weight-average molecular weight from 2,000,000 to 8,000,000 (b) from 0.05–0.5% by weight of a sulphate-containing anionic surfactant. The method is effective even in difficult soils.

14 Claims, No Drawings

FOAMING COMPOSITION

This invention relates to tunnel boring and to compositions for use therein.

Shield tunnel boring machines are increasingly used in the boring of tunnels, because they offer many advantages such as the ability to bore in a wide variety of strata. A shield boring machine comprises a circular rotatable cutting head mounted on a cylindrical shield of similar diameter such that its axis of rotation coincides with the longitudinal axis of the shield. Within the shield there are contained means for feeding materials to the cutting head and means for conveying away the soil. Such machines perform well when the strata through which a tunnel is being bored is relatively hard and firm, but they do not perform so well in soft and crumbly strata which can make soil removal very difficult. One way of seeking to overcome this problem is to apply a consolidation agent to the soil via the cutting head. This stabilises the soil, allowing boring to be more easily effected and the soil to be more easily removed.

Known stabilising agents have included bentonite slurrys and polymer suspensions. These can lead to problems in certain soils, largely because they increase the soil water content appreciably. Some soils (such as clays) can become sticky and difficult to remove and clog up the cutting head, resulting in a substantial loss in efficiency. In a more recent development, polymer foams have been suggested. These have the advantage that considerably less fluid is placed in the soil per given volume. A typical foam formulation will comprise a foaming agent and a foam stabilising agent, the latter generally a surfactant. Thus, in operation, the foam is injected from ports in the cutting head into the face being bored.

It has now been found that a particular foaming material gives especially efficaceous results. The invention therefore provides a method of boring a tunnel through a stratum by means of a shield tunnelling apparatus, the process comprising the injection into the stratum at the cutting face of an aqueous material comprising (a) from 0.005–0.05% by weight of a polyethylene oxide of weight-average molecular weight from 2,000,000 to 8,000,000; and (b) from 0.05–0.5% by weight of a sulphate-containing anionic surfactant.

The invention additionally provides a foaming material, comprising (a) from 0.005–0.05% by weight of a polyethylene oxide of weight-average molecular weight from 2,000,000 to 8,000,000; and (b) from 0.05–0.5% by weight of a sulphate-containing anionic surfactant.

The invention additionally provides the use of a foaming material as hereinabove defined in the conveying of soil from the cutting face of a shield tunnelling apparatus.

Polyethylene oxides (PEO) are well-known items of commerce and a suitable material may be selected from the wide range available. Typical examples are the "Polyox" (trade mark) materials of Union Carbide. The anionic surfactant may be selected from any such sulphate-containing surfactant known to the art. A particularly preferred type is polyoxyalkylene alkyl ether sulphate, where the polyalkyleneoxide chain has an average chain length of 2–3 alkylene oxide units. Typical commercial materials include the "Alscope" (trade mark) series of Toho Chemical Industry Co.

Preferably the quantities of PEO and surfactant present are from 0.02 to 0.04% and from 0.15 to 0.4% by weight, respectively. Most preferably, the PEO quantity is from 0.030–0.04%.

The rest of the aqueous material is generally water, but other art-recognised ingredients (such as biocides and complexing agents) can be added in art-recognised quantities. In a preferred embodiment of the invention, the aqueous material additionally comprises urea, to the extent of from 0.03–0.8%, preferably 0.06–0.25% by weight. The invention therefore also provides a tunnelling foaming additive consisting essentially of polyethylene oxide, sulphate-containing anionic surfactant and urea and water.

Another especially useful ingredient is a foam improver. Foam improvers are materials which are well known in the art for their ability to stabilise foams. They are typically amines with long fatty acid chains derived from natural fats and oils, for example coconut oil.

The aqueous material may be prepared and stored in advance as a single material, but it is preferred to provide it as two components which are mixed prior to use. In this case, one component comprises PEO and surfactant, and the other is a dilute aqueous solution of PEO, typically at a weight concentration of from 0.007–0.015%, preferably from 0.0150–0.06%. Both of course contain sufficient water to ensure that they are sufficiently fluid, and sufficient of the essential ingredients to give on mixing proportions of the size listed hereinabove—appropriate mixtures with respect to molecular weights and proportions are readily determined. The water content of the aqueous material should be such that it has a viscosity as measured by the Bohlin System 3 apparatus, using spindle 1 of from 600–1200 mPa.s., and in the case of the two component embodiment, the water contents of the individual components should be such as to achieve this. The two-component embodiment is exceptionally storage-stable.

In operation, the aqueous material is supplied to the machine, where it is diluted to typically a 3% solution of total aqueous material in water and foamed by conventional means and injected into the tunnel face via ports in the cutting head. In addition, foam can also be injected from ports in the shield to strengthen the tunnel walls.

The invention is further described with reference to the following non-limiting worked examples.

EXAMPLE 1

The following materials are blended

|  | parts by weight |
|---|---|
| polyoxyalkylene alkyl ether sulphate[1] | 8.58 |
| urea | 5.00 |
| polyethylene oxide[2] | 1.20 |
| biocide[3] | 0.02 |
| complexing agent[4] | 0.02 |
| water | 85.18 |

[1]"Alscope" W 140
[2]"Polyox" (trade mark) WSR-301
[3]"Biotack" (trade mark)
[4]"Clewat" (trade mark)

This composition provides a concentrate for use, which use is demonstrated in Example 2.

EXAMPLE 2

Testing of the composition of Example 1 on a soil.

The soil which is used is taken from Madrid where the tunnelling for the new metro has been especially difficult. The experiment consists of taking four 1000 g-sized samples of this soil (a heavy clay), adding a material to three of these in an attempt to make it removable, agitating the mixture in a Hobart mixer for 3 minutes and then checking the viscosity by means of a Haake VT02 Viscometer. The stickiness of the material in the Hobart mixing bowl is also assessed.

To each of three 1000 g samples are added one of the following:

(a) 65 g water (b) 65 g of a 3% solution of a foaming agent "Rheocell" (trade mark), foamed 1:10 with air (1 volume solution to 9 volumes air)

(c) 65 g of a 3% solution of the composition of Example 1 foamed 1:10 with air

In addition to the viscosity (which is an indication of the ease of soil removal from a cutting head), the stickiness of the material is assessed comparatively when cleaning out the mixing bowls. The ratings for stickiness are 1—very sticky, soil will not pour from bowl and is removable only with difficulty 2—sticky, soil will not pour from bowl, but can be removed relatively easily 3—not sticky, most soil pours out of bowl and the little residue remaining is easily removed.

The results are as follows:

|  | Viscosity (poise) | Stickiness |
| --- | --- | --- |
| mud alone | 1000[1] | 1 |
| (a) mud and water | 300[1] | 1 |
| (b) mud and foaming agent | 50[2] | 2 |
| (c) mud and Example 1 composition | 50[2] | 3 |

[1]The measurements are made using a No. 2 spindle, used for thick liquids and paste.
[2]A larger spindle (No.1) is used for thinner liquids and pastes.

It can be seen that the composition according to the invention gives substantial improvements in both viscosity and stickiness, even though a bigger spindle (which normally gives a higher viscosity reading than a smaller one) was used.

EXAMPLE 3

Example of a Two-component System

A two-part system is formed by using 1 part of the composition of Example 1 with up to 10 parts of water which contain 1% by weight of "Polyox" WSR-301. The proportion of this polyethylene oxide solution is adjusted, depending on the water content of the mud involved.

When tested according to the procedure of Example 2, the composition gives the same excellent results as that of the composition of Example 1.

EXAMPLES 4–7

A number of compositions according to the invention are prepared and tested according to the procedure set out in Example 2.

The compositions are shown in the following table:

| Example No | sulphate-containing surfactant | polyethylene oxide | complexing agent | foam improver |
| --- | --- | --- | --- | --- |
| 4 | Zetesol NL2 | Polyox WSR-301 | Cublen K2523 | Urea |
| 5 | Sulfetal Cjot 60 | Polyox WSRN-60K | Masquol P430 NA | Aromox MCD-W |
| 6 | Hostaspur OS-1 | Polyox WSRN-60K | Sequion 50K33 | Quiminox QL |
| 7 | Empicol LX 42 | Polyox WSR-301 | Cublen AP1 | Aromox C/12-W |

The materials used are as follows:

"Zetesol" (trade mark) NL2 (ex Zschimmer & Schwarz)—sodium lauryl ether sulphate.

"Sulfetal" (trade mark) Cjot 60 (ex Zschimmer & Schwarz)—monoisopropanolammonium lauryl sulphate.

"Hostaspur" (trade mark) OS-1 (ex Clariant)—sodium oleyl sulphonate.

"Empicol" (trade mark) LX 42 (ex Albright & Wilson)—sodium lauryl sulphate.

"Polyox" (trade mark) WSRN-60K (ex Union Carbide)—polyethylenexide, molecular weight (weight-average) about 2 million.

"Polyox" WSR-301—polyethylene oxide, molecular weight (weight-average) about 4 million.

"Cublen" (trade mark) K2523 (ex Zschimmer & Schwarz)—tripotassium hydroxyethane diphosphonic acid.

"Masquol" (trade mark) P 430 Na (ex Protex)—hexasodium ethylenediamine tetra(methylenephosphonic) acid.

"Sequion" (trade mark) 50 K 33 (ex Bozzetto)—hexapotassium ethylenediamine tetra (methylenephosphonic) acid.

"Aromox" (trade mark) C/12-W (ex Akzo-Nobel)—coco-bis-(2-hydroxyethyl)amine oxide.

"Aromox" MCD-W—cocodimethylamine oxide.

"Quiminox" (trade mark) QL (ex Qimidroga) cocodimethylamine oxide.

The test results obtained are rated 3, as are those of the compositions of Examples 1 and 3.

What is claimed is:

1. A method of boring a tunnel through a stratum by means of a shield tunneling apparatus, the process comprising the steps of:
   boring a tunnel, and
   the injection into the stratum at the cutting face of an aqueous material comprising
   (a) from 0.005–0.05% by weight of a polyethylene oxide of weight-average molecular weight from 2,000,000 to 8,000,000
   (b) from 0.05–0.5% by weight of a polyoxyalkylene alkyl ether sulphate, where the polyalkyleneoxide chain has an average chain length of 2–3 alkylene oxide units.

2. A method according to claim 1, wherein the aqueous material additionally comprises urea.

3. A method according to claim 1, wherein the aqueous material additionally comprises a foam booster.

4. A method according to claim 1, wherein the aqueous material comprises 0.020–0.04% by weight of polyethylene oxide.

5. A method according to claim 1, wherein the aqueous material comprises 0.15–0.4% by weight of the polyoxyalkylene alkyl ether sulphate.

6. A method according to claim 1, wherein the aqueous material comprises 0.02–0.04% by weight of polyethylene oxide and 0.15–0.4% by weight of the polyoxyalkylene alkyl ether sulphate.

7. A method according to claim 1, wherein the aqueous material comprises 0.15–0.4% by weight of the sulphate-containing anionic surfactant.

8. A foaming material adapted to assist the conveyance of soil from the cutting face of a shield tunneling apparatus, comprising
   (a) from 0.005–0.05% by weight of a polyethylene oxide of weight-average molecular weight from 2,000,000 to 8,000,000
   (b) from 0.05–0.5% by weight of a polyoxyalkylene alkyl ether sulphate, where the polyalkyleneoxide chain has an average chain length of 2–3 alkylene oxide units.

9. A foaming material according to claim 8 wherein the aqueous material additionally comprises urea.

10. A foaming material according to claim 8 wherein the aqueous material additionally comprises a foam booster.

11. A method of boring a tunnel through a stratum by means of a shield tunnelling apparatus the process comprising the steps of:
   boring a tunnel and,
   injection into the stratum of an aqueous material comprising:
     (a) from 0.005–0.05% by weight of a polyethylene oxide of weight-average molecular weight from 2,000,000 to 8,000,000 and having an average chain length of 2–3 alkylene oxide units; and,
     (b) from 0.05–0.5% by weight of a polyoxyalkylene alkyl ether sulphate surfactant.

12. A method according to claim 11 wherein the aqueous material additionally comprises urea.

13. A method according to claim 11 wherein the aqueous material additionally comprises a foam booster.

14. A method according to claim 11, wherein the aqueous material comprises 0.02–0.04% by weight of polyethylene oxide.

\* \* \* \* \*